US011492470B2

(12) United States Patent
Schnell et al.

(10) Patent No.: US 11,492,470 B2
(45) Date of Patent: Nov. 8, 2022

(54) REINFORCED RUBBER COMPOSITION

(71) Applicant: COMPAGNIE GENERALE DES ETABLISSEMENTS MICHELIN, Clermont-Ferrand (FR)

(72) Inventors: Benoit Schnell, Clermont-Ferrand (FR); Corentin Pavageau, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 399 days.

(21) Appl. No.: 16/472,452

(22) PCT Filed: Dec. 21, 2017

(86) PCT No.: PCT/FR2017/053755
§ 371 (c)(1),
(2) Date: Jun. 21, 2019

(87) PCT Pub. No.: WO2018/115758
PCT Pub. Date: Jun. 28, 2018

(65) Prior Publication Data
US 2021/0130594 A1    May 6, 2021

(30) Foreign Application Priority Data

Dec. 22, 2016 (FR) .................................... 1663175

(51) Int. Cl.
| C08L 23/08 | (2006.01) |
| B60C 1/00 | (2006.01) |
| C08K 3/36 | (2006.01) |
| C08K 5/14 | (2006.01) |
| C08K 5/5425 | (2006.01) |
| C08K 5/548 | (2006.01) |
| C08L 9/06 | (2006.01) |
| C08L 31/04 | (2006.01) |

(52) U.S. Cl.
CPC ............ *C08L 23/0853* (2013.01); *B60C 1/00* (2013.01); *C08K 3/36* (2013.01); *C08K 5/14* (2013.01); *C08K 5/548* (2013.01); *C08K 5/5425* (2013.01); *C08L 9/06* (2013.01); *C08L 31/04* (2013.01)

(58) Field of Classification Search
CPC ........ C08L 23/0853; C08L 9/06; C08L 31/04; B60C 1/00; C08K 3/36; C08K 5/14
USPC ...................................................... 523/156
See application file for complete search history.

(56) References Cited

U.S. PATENT DOCUMENTS

| 3,988,496 | A | 10/1976 | Biggs et al. | |
| 4,104,329 | A * | 8/1978 | Abdou-Sabet | ...... C08F 255/026 |
| | | | | 525/260 |
| 4,937,303 | A | 6/1990 | Wolf et al. | |
| 5,977,238 | A | 11/1999 | Labauze | |
| 6,013,718 | A | 1/2000 | Cabioch et al. | |
| 6,013,737 | A * | 1/2000 | Takagishi | ................ C08K 3/36 |
| | | | | 525/332.7 |
| 6,503,973 | B2 | 1/2003 | Robert et al. | |
| 6,610,261 | B1 | 8/2003 | Custodero et al. | |
| 6,747,087 | B2 | 6/2004 | Custodero et al. | |
| 6,815,473 | B2 | 11/2004 | Robert et al. | |
| 7,250,463 | B2 | 7/2007 | Durel et al. | |
| 7,312,264 | B2 | 12/2007 | Gandon-Pain | |
| 8,344,063 | B2 | 1/2013 | Marechal et al. | |
| 8,394,903 | B2 | 3/2013 | Marechal | |
| 8,455,584 | B2 | 6/2013 | Robert et al. | |
| 8,492,479 | B2 | 7/2013 | Robert et al. | |
| 2001/0036991 | A1 | 11/2001 | Robert et al. | |
| 2002/0183436 | A1 | 12/2002 | Robert et al. | |
| 2005/0004297 | A1 | 1/2005 | Durel et al. | |
| 2006/0089445 | A1 | 4/2006 | Gandon-Pain | |
| 2006/0122302 | A1* | 6/2006 | Pazur | ...................... C08L 29/04 |
| | | | | 524/430 |
| 2010/0184912 | A1 | 7/2010 | Marechal et al. | |
| 2010/0249270 | A1 | 9/2010 | Robert et al. | |
| 2010/0252156 | A1 | 10/2010 | Robert et al. | |
| 2010/0260991 | A1* | 10/2010 | Subramanian | ........ B32B 27/325 |
| | | | | 428/213 |
| 2011/0251354 | A1 | 10/2011 | Marechal | |

(Continued)

FOREIGN PATENT DOCUMENTS

| CN | 102391630 A | 3/2012 |
| CN | 104136237 A | 11/2014 |

(Continued)

OTHER PUBLICATIONS

S. Brunauer, et al., "Adsorption of Gases in Multimolecular Layers", J. Am. Chem. Soc., vol. 60, pp. 309-319 (1938).

(Continued)

*Primary Examiner* — Doris L Lee
(74) *Attorney, Agent, or Firm* — Venable LLP

(57) ABSTRACT

A rubber composition is based on at least: a copolymer A based on at least one ethylene monomer and on at least one vinyl acetate monomer; a reinforcing inorganic filler, said inorganic filler comprising silica; as agent for coupling between said copolymer A and said reinforcing inorganic filler, an organosilane compound of formula (I)

$$\text{B-Z-Si}(G^1)_{(3-d)}(G^2)_{(d)} \tag{I}$$

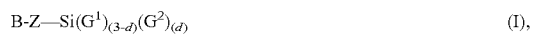

wherein B, Z, $G^1$, $G^2$ and (d) have the meanings indicated in the claims; and a peroxide crosslinking system. This composition is especially intended for the manufacture of semi-finished products for tires or for the manufacture of tires.

15 Claims, No Drawings

(56) References Cited

U.S. PATENT DOCUMENTS

| | | |
|---|---|---|
| 2011/0319566 A1 | 12/2011 | Nishijima et al. |
| 2012/0273718 A1 | 11/2012 | Kerommes et al. |
| 2013/0150516 A1* | 6/2013 | Lettow .................... C08L 21/00 524/495 |
| 2015/0119504 A1* | 4/2015 | Park ........................ C08K 7/02 524/35 |
| 2019/0375926 A1 | 12/2019 | Pavageau et al. |

FOREIGN PATENT DOCUMENTS

| | | |
|---|---|---|
| EP | 0307755 A2 | 3/1989 |
| EP | 0341499 A2 | 11/1989 |
| EP | 1085049 A2 | 3/2001 |
| EP | 1127909 A1 | 8/2001 |
| FR | 2740778 A1 | 5/1997 |
| FR | 2765882 A1 | 1/1999 |
| JP | 7-133386 A | 5/1995 |
| WO | 96/37547 A2 | 11/1996 |
| WO | 99/28380 A1 | 6/1999 |
| WO | 01/92402 A1 | 12/2001 |
| WO | 03/016387 A1 | 2/2003 |
| WO | 2004/096865 A1 | 11/2004 |
| WO | 2008/141702 A1 | 11/2008 |
| WO | 2009/000750 A1 | 12/2008 |
| WO | 2009/000752 A1 | 12/2008 |
| WO | 2010/072761 A1 | 7/2010 |
| WO | 2011/067504 A1 | 6/2011 |
| WO | 2014/042943 A1 | 3/2014 |

OTHER PUBLICATIONS

International Search Report dated Apr. 3, 2018, in corresponding PCT/FR2017/053755 (6 pages).

* cited by examiner

REINFORCED RUBBER COMPOSITION

BACKGROUND

The present invention relates to rubber compositions reinforced by a reinforcing filler, especially intended for the manufacture of tyres or of semi-finished products for tyres, in particular the treads of these tyres.

The compositions of rubbers used in the manufacture of tyres usually comprise natural or synthetic rubbers which are diene elastomers comprising carbon-carbon double bonds, also referred to as unsaturations, in their main chain. The presence of these double bonds makes these elastomers sensitive in particular to thermal oxidation, for instance the heating which occurs during the use of the tyre. This heating may lead to modifications of the properties of the rubber compositions, and especially to changing the mechanical properties of these compositions and the behaviour of the semi-finished articles containing them.

Moreover, tyre manufacturers are continually striving to find solutions in order to improve the endurance of tyres.

One solution envisaged consists in partially replacing the elastomers conventionally used with elastomers not comprising any, or many, double bonds in their main chain, for instance copolymers of ethylene and of vinyl acetate (EVA copolymers).

EVA copolymers are thermoplastic copolymers having an elastomeric nature. They are mainly used in the fields of packaging, food and adhesives.

In the field of tyres, document EP1085049A2 describes the use of EVA copolymers in a minor amount relative to the usual diene elastomers in order to improve the grip of treads for winter tyres.

Indeed, it is known from document WO2014/042943A1 that the presence of reinforcing fillers such as silica or carbon black has a harmful effect on the stability of EVA copolymers at high temperature (temperature of use).

However, the presence of reinforcing fillers is indispensable in a rubber composition in order to obtain tyres having good wear resistance. In order to solve the problem associated with the presence of fillers in a composition comprising EVA copolymers, document WO2014/042943A1 teaches the addition of a polyamide into the composition at a content ranging from 5 to 60% by weight. These compositions have the drawback of being too stiff and are not suitable for use in tyres.

There is therefore still a need to produce compositions or mixtures of rubbers having stable properties, such as stiffness for example, despite the thermal changes (variations) experienced by the compositions or mixtures during the use thereof.

The applicant has discovered, surprisingly, and contrary to expectations, that EVA copolymers could replace all or part of the usual diene elastomers of rubber compositions for tyres. Indeed, a specific combination of a copolymer based on at least one ethylene monomer and on at least one vinyl acetate monomer and of a specific organosilane coupling agent, in the presence of reinforcing inorganic fillers, made it possible to obtain compositions having a stiffness which does not change very much as a function of the temperature, while retaining resistance to high strain and good reinforcing.

SUMMARY

Thus, a subject of the present invention is a rubber composition based on at least:
a copolymer A based on at least one ethylene monomer and on at least one vinyl acetate monomer;
a reinforcing inorganic filler comprising silica;
as agent for coupling between said copolymer A and said reinforcing inorganic filler, an organosilane compound of formula (I)

$$B\text{-}Z\text{—}Si(G^1)_{(3-d)}(G^2)_{(d)} \qquad (I)$$

in which:
B represents a functional group interacting with the copolymer A, the group B being chosen from vinyl groups, halogen atoms, unsaturated α,β-enones, acryloxy groups, methacryloxy groups, acrylamido groups, methacrylamido groups and amino groups,
Z represents a spacer group formed of a divalent hydrocarbon-based chain comprising from 1 to 18 carbon atoms and making it possible to connect the group B to the silicon atom;
$G^1$, which are identical or different, each represent a monovalent hydrocarbon-based group chosen from linear or branched alkyls having from 1 to 18 carbon atoms, substituted or unsubstituted cycloalkyls or aryls having from 5 to 18 carbon atoms, substituted or unsubstituted alkenyloxyls having from 2 to 18 carbon atoms, substituted or unsubstituted aryloxy or aralkyloxy groups having from 6 to 18 carbon atoms, or a monovalent group in the form $R^1$—(—O—$(CJ_2)_a)_b$-O— in which J represents a hydrogen, a phenyl group or an alkyl group having from 1 to 4 carbon atoms, b is an integer within the range 1 to 18 and a is an integer within the range 1 to 6, and $R_1$ being chosen from linear or branched, substituted or unsubstituted alkyls having from 1 to 4 carbon atoms or linear or branched, substituted or unsubstituted alkoxyls having from 1 to 4 carbon atoms,
$G^2$, which are identical or different, each represent a monovalent group chosen from the hydroxyl (—OH) group, linear or branched, substituted or unsubstituted alkoxyls having from 1 to 18 carbon atoms;
d is equal to 1, 2 or 3; and
a peroxide crosslinking system.

Preferentially, in the composition as defined above, the hydrocarbon-based chain of the spacer group Z of the organosilane compound of formula (I) is interrupted with one or more heteroatoms chosen from O, S and N.

Preferentially, in the composition as defined above, the spacer group Z of the organosilane compound of formula (I) is chosen from linear or branched C1-C18 alkylenes, C7-C12 alkylarylenes and C7-C12 arylalkylenes, preferably from linear or branched C1-C8 alkylenes, C7-C10 alkylarylenes and C7-C10 arylalkylenes.

Preferentially, in the composition as defined above, the group $G^1$ of the organosilane compound of formula (I), which are identical or different, is chosen from linear or branched alkyls having from 1 to 10 carbon atoms, substituted or unsubstituted cycloalkyls or aryls having from 5 to 10 carbon atoms or a monovalent group in the form $R^1$—(—O—$(CJ_2)_a)_b$-O— in which J represents a hydrogen or an alkyl group having from 1 to 4 carbon atoms, b is an integer within the range 1 to 4, and a is an integer within the range 1 to 4, and $R_1$ being chosen from linear or branched, substituted or unsubstituted alkyls having from 1 to 4 carbon atoms or linear or branched, substituted or unsubstituted alkoxyls having from 1 to 4 carbon atoms and the group $G^2$ of the organosilane compound of formula (I), which are identical or different, each represent a monovalent group chosen from the hydroxyl (—OH) group, linear or branched, substituted or unsubstituted alkoxyls having from 1 to 10 carbon atoms.

Preferentially, in the composition as defined above, the coupling agent is an organosilane compound of formula (I), in which:
the group B is chosen from halogen atoms (preferably bromine), acryloxy groups, methacryloxy groups, acrylamido groups, methyacrylamido groups and amino groups;
Z represents a spacer group formed of a divalent hydrocarbon-based chain and is chosen from linear or branched C1-C8 alkylenes;
$G^1$, which are identical or different, each represent a monovalent hydrocarbon-based group chosen from linear or branched alkyls having from 1 to 4 carbon atoms or a monovalent group in the form $R^1$—(—O—$(CJ_2)_a)_b$-O— in which J represents a hydrogen or an alkyl group having from 1 to 4 carbon atoms, b is an integer within the range 1 to 4 and a is an integer within the range 1 to 4, and $R_1$ being chosen from linear or branched, substituted or unsubstituted alkyls having from 1 to 4 carbon atoms or linear or branched, substituted or unsubstituted alkoxyls having from 1 to 4 carbon atoms;
$G^2$, which are identical or different, each represent a monovalent group chosen from the hydroxyl (—OH) group, linear or branched, substituted or unsubstituted alkoxyls having from 1 to 4 carbon atoms; and
d is equal to 1, 2 or 3.

Preferentially, in the composition as defined above, the molar content of ethylene monomer in the copolymer A is greater than or equal to 51%, preferably greater than or equal to 55%.

Preferentially, in the composition as defined above, the molar content of ethylene monomer in the copolymer A ranges from 57% to 90%.

Preferentially, in the composition as defined above, the copolymer A consists of ethylene monomer and vinyl acetate monomer.

Preferentially, the composition as defined above comprises a mixture of copolymers A that are different from one another.

Preferentially, in the composition as defined above, the content of copolymer or of the mixture of copolymers A is at least 50 phr.

Preferentially, in the composition as defined above, the content of copolymer or of the mixture of copolymers A is equal to 100 phr.

Preferentially, the composition as defined above also comprises a polymer C, different from the copolymer A, the polymer C being a diene elastomer.

Preferentially, in the composition as defined above, the diene elastomer has a molar content of diene units of less than 15%.

Preferentially, in the composition as defined above, the content of reinforcing inorganic filler is greater than or equal to 20 phr.

Preferentially, in the composition as defined above, the content of the organosilane compound of formula (I) ranges from 0.2 to 12 phr.

Preferentially, in the composition as defined above, the content of the organosilane compound of formula (I) is greater than or equal to 1% by weight relative to the weight of the reinforcing inorganic filler.

Preferentially, in the composition as defined above, the content of the organosilane compound of formula (I) ranges from 1% to 15% by weight relative to the weight of the reinforcing inorganic filler.

Another subject of the invention is a semi-finished article for tyres, comprising at least one composition as described above.

Another subject of the invention is a tyre comprising at least one composition as defined above or comprising at least one semi-finished article as described above.

DETAILED DESCRIPTION

I. Measurements and Tests Used

I-1 Tensile Tests

These tests make it possible to determine the elasticity stresses and the properties at break. Unless otherwise indicated, they are carried out in accordance with French Standard NF T 46-002 of September 1988. The nominal secant moduli (or apparent stresses, in MPa) at 50% elongation (denoted MA50), 100% elongation (MA100) and 300% elongation (MA300) are measured in second elongation (i.e., after an accommodation cycle). The breaking stresses (in MPa) are also measured. All these tensile measurements are carried out under the standard conditions of temperature (23±2° C.) and hygrometry (50±5% relative humidity), according to French Standard NF T 40-101 of December 1979, and under the following temperature conditions: 100±2° C.

I-2) Measurement of the BET Specific Surface Area

The BET specific surface area is determined in a known way by gas adsorption using the Brunauer-Emmett-Teller method described in *The Journal of the American Chemical Society*, Vol. 60, page 309, February 1938, more specifically according to French Standard NF ISO 9277 of December 1996 (multipoint (5 point) volumetric method—gas: nitrogen—degassing: 1 hour at 160° C.—relative pressure $p/p_0$ range: 0.05 to 0.17). The CTAB specific surface area is the outer surface area determined according to French Standard NF T 45-007 of November 1987 (method B).

II. Detailed Description

Thus, the invention relates to a rubber composition based on at least:
a copolymer A based on at least one ethylene monomer and on at least one vinyl acetate monomer, the copolymer A preferably being present at a content of greater than or equal to 50 phr,
a reinforcing inorganic filler comprising silica;
as agent for coupling between said copolymer A and said reinforcing inorganic filler, an organosilane compound of formula (I)

in which:
B represents a functional group interacting with the copolymer A, the group B being chosen from vinyl groups, halogen atoms, unsaturated α,β-enones, acryloxy groups, methacryloxy groups, acrylamido groups, methacrylamido groups and amino groups,
Z represents a spacer group formed of a divalent hydrocarbon-based chain comprising from 1 to 18 carbon atoms and making it possible to connect the group B to the silicon atom;

$G^1$, which are identical or different, each represent a monovalent hydrocarbon-based group chosen from linear or branched alkyls having from 1 to 18 carbon atoms, substituted or unsubstituted cycloalkyls or aryls having from 5 to 18 carbon atoms, substituted or unsubstituted alkenyloxyls having from 2 to 18 carbon atoms, substituted or unsubstituted aryloxy or aralkyloxy groups having from 6 to 18 carbon atoms, or a monovalent group in the form $R^1$—(—O—$(CJ_2)_a)_b$-O— in which J represents a hydrogen, a phenyl group or an alkyl group having from 1 to 4 carbon atoms, b is an integer within the range 1 to 18 and a is an integer within the range 1 to 6, and $R_1$ being a linear or branched, substituted or unsubstituted alkyl having from 1 to 4 carbon atoms or a linear or branched, substituted or unsubstituted alkoxyl having from 1 to 4 carbon atoms, $G^2$, which are identical or different, each represent a monovalent group chosen from the hydroxyl (—OH) group, linear or branched, substituted or unsubstituted alkoxyls having from 1 to 18 carbon atoms, d is equal to 1, 2 or 3, and a peroxide crosslinking system.

In the present description, unless expressly indicated otherwise, all the percentages (%) shown are percentages by weight.

Furthermore, any range of values denoted by the expression "between a and b" represents the range of values extending from more than "a" to less than "b" (that is to say, limits a and b excluded), while any range of values denoted by the expression "from a to b" means the range of values extending from "a" up to "b" (that is to say, including the strict limits a and b). In the present document, when a range of values is denoted by the expression "from a to b", the range represented by the expression "between a and b" is also and preferentially denoted.

The abbreviation "phr" (per hundred parts of rubber) means parts by weight per hundred parts by weight of elastomer (or of the total of the elastomers, if several elastomers are present) or rubber present in the rubber composition. The use of this unit is conventional in the field of rubber compositions. By extension, for the compositions of the invention, the abbreviation "phr" will also mean parts by weight per hundred parts by weight of copolymer A. When the composition comprises, for example, a coupling of copolymer A and of elastomer(s), the sum of the contents by weight of the copolymer A and of the elastomer(s) is equal to 100 phr and the content by weight of the other constituents of the composition is expressed in phr relative to the 100 phr of the copolymer A and the elastomer(s).

The term "rubber composition based on" should be understood as meaning a rubber composition including the mixture and/or the reaction product of the various constituents used, some of these base constituents being capable of reacting, or intended to react, with one another, at least in part, during the various phases of manufacture of the composition, in particular during the crosslinking or vulcanization thereof.

As is customary in the present application, the terms "elastomer" and "rubber" are used equivalently in the present description. These terms are interchangeable.

The term "polymer" is intended to mean a linear or branched macromolecule having a sequence composed of several repeating units (or monomer units), these repeating units being able to have the same chemical structure or a different chemical structure (reference will then optionally be made to copolymer or terpolymer).

All the glass transition temperature "Tg" values are measured in a known manner by DSC (Differential Scanning calorimetry) according to the standard ASTM D3418 (1999), unless expressly indicated otherwise.

It is possible for example to measure the amount (by weight or by mol) of each monomer within the polymer, that is to say of the copolymer A and of the polymer C, using the known techniques of Fourier transform infrared spectroscopy and standard ISO8985 of 1998.

According to the invention, the carbon-based products mentioned in the description may be of fossil or biobased origin. In the latter case, they may partially or completely result from biomass or be obtained from renewable starting materials resulting from biomass. The compounds (such as monomers, polymers), the reagents and other components mentioned in the description, such as the fillers, etc., are concerned in particular.

Copolymer A

The rubber composition in accordance with the invention comprises at least one copolymer A, preferably at a content greater than or equal to 50 phr, said copolymer A being a copolymer based on at least one ethylene monomer and on at least one vinyl acetate monomer.

The term "copolymer based on at least one ethylene monomer and on at least one vinyl acetate monomer" is intended to mean a polymer based on at least one or more ethylene monomers and on at least one or more vinyl acetate monomers. This type of copolymer is well known to those skilled in the art under the name of EVA copolymer. This copolymer may therefore result from the polymerization of ethylene monomers (monomers E) and of vinyl acetate monomers (monomers VA). Of course, other monomers different to the ethylene and vinyl acetate monomers may optionally be present in the copolymer. This or these different monomers (monomers X) have polymerizable functions with reactivity which is identical or substantially identical to the monomers E and the monomers VA and may be distributed randomly along the chain of the copolymer.

The monomers X may be chosen from esters of unsaturated carboxylic acids, for instance C1-C10 alkyl acrylates or C1-C10 alkyl methacrylates, alpha-olefins such as propene, 1-butene, 1-hexene, monomers bearing an epoxide function, monomers bearing an anhydride function, monomers bearing a carboxylic acid function. The following monomers are especially suitable as monomer X: C1-C10 alkyl acrylates, C1-C10 alkyl methacrylates, glycidyl methacrylate, glycidyl acrylate, maleic anhydride, maleic anhydride hemiesters, acrylic acid and methacrylic acid.

The composition in accordance with the invention may comprise one or more copolymers A, i.e. a mixture or a blend of two or more different copolymers A. For example, the composition may comprise a copolymer of ethylene and of vinyl acetate and a terpolymer of ethylene/vinyl acetate/monomer X or else, when the copolymer A consists of monomers of ethylene and of vinyl acetate, the composition may comprise copolymers having different molar contents of ethylene monomers.

The copolymer A (or the mixture of copolymers A) is (are) the predominant copolymer of the composition of the invention, that is to say that it (they) represent(s) at least 50% by weight of the total weight of the polymers of the composition. In other words, the copolymer(s) A is (are) present in the composition at a content of greater than or equal to 50 phr, preferably strictly greater than 50 phr.

Preferentially, the molar content of ethylene monomer in the copolymer A is greater than or equal to 51%, preferably greater than or equal to 55%. More preferentially, the molar content of ethylene monomer in the copolymer A ranges from 57% to 90%, even more preferably ranges from 57% to 85%.

When the copolymer A results from the copolymerization of monomers of ethylene, of vinyl acetate and of one or more monomers X, the molar percentage of the monomer(s) X (including that of the preferred monomers X above) is strictly less than 5%; preferentially, the molar content of ethylene monomers is greater than or equal to 51%. Preferably, the molar percentage of the monomer(s) X (including that of the preferred monomers X above) ranges from 0.1% to 5%; the molar content of ethylene monomers is advantageously greater than or equal to 51%.

Preferentially, when the copolymer A results from the copolymerization of monomers of ethylene, of vinyl acetate and of one or more monomers X, the molar percentage of the monomer(s) X (including that of the preferred monomers X above) is strictly less than 5%; the molar content of ethylene monomers advantageously ranges from 57% to 85%.

Preferentially, the copolymer A consists of ethylene monomers and of vinyl acetate monomers. In other words, the sum of the molar percentages of ethylene monomers and of vinyl acetate monomers in the copolymer A is equal to 100%.

The copolymers A are preferentially random polymers. They may especially be obtained by high-pressure polymerization of the corresponding monomers with the processes known to those skilled in the art. These copolymers may especially be obtained according to the processes described in documents EP0341499A2 and EP0307755A2.

The copolymers A described above have a glass transition temperature Tg which in the very great majority of cases is negative (that is to say, less than 0° C., measured at atmospheric pressure). The Tg of the copolymers A described above is measured in a known way by DSC (Differential Scanning calorimetry) according to standard ASTM D3418 of 1999.

The copolymers A are commercially available, especially from suppliers such as Arkema, E.I du Pont de Nemours and Company, Arlanxeo.

According to one embodiment of the composition according to the invention, the content of copolymer A or of the mixture of copolymers A in the composition is equal to 100 phr.

Polymer C

According to another embodiment of the invention, the composition may also comprise at least one polymer C different from the copolymer(s) A.

This polymer C is preferably a diene elastomer.

The term "diene" elastomer, whether natural or synthetic, should be understood to mean an elastomer consisting at least in part (that is to say a homopolymer or a copolymer) of diene monomer(s) (i.e. monomer(s) bearing two conjugated or non-conjugated carbon-carbon double bonds).

These diene elastomers can be classified into two categories: "essentially unsaturated" or "essentially saturated". "Essentially unsaturated" is generally intended to mean a diene elastomer resulting at least in part from conjugated diene monomers having a content of units of diene origin (conjugated dienes) which is greater than 15% (mol %); thus, diene elastomers such as butyl rubbers or copolymers of dienes and of alpha-olefins of EPDM type do not come within the preceding definition and can in particular be described as "essentially saturated" diene elastomers (low or very low content, always less than 15% (mol %), of units of diene origin). In the category of "essentially unsaturated" diene elastomers, "highly unsaturated" diene elastomer is intended to mean in particular a diene elastomer having a molar content of units of diene origin (conjugated dienes) which is greater than 50% (mol %).

Given these definitions, diene elastomer capable of being used in the compositions in accordance with the invention is intended more particularly to mean:

a)—any homopolymer of a conjugated diene monomer, especially any homopolymer obtained by polymerization of a conjugated diene monomer having from 4 to 12 carbon atoms;

b)—any copolymer obtained by copolymerization of one or more conjugated dienes with one another or with an ethylene monomer or with one or more vinylaromatic compounds having from 8 to 20 carbon atoms;

(c)—a ternary copolymer obtained by copolymerization of ethylene and an α-olefin having from 3 to 6 carbon atoms with an unconjugated diene monomer having from 6 to 12 carbon atoms, such as, for example, the elastomers obtained from ethylene and propylene with an unconjugated diene monomer of the abovementioned type, such as, especially, 1,4-hexadiene, ethylidenenorbornene or dicyclopentadiene;

d)—a copolymer of isobutene and of isoprene (butyl rubber) and also the halogenated versions, in particular chlorinated or brominated versions, of this type of copolymer.

Although it applies to any type of diene elastomer, those skilled in the art of tyres will understand that this embodiment is preferably employed with essentially unsaturated diene elastomers, in particular of the above type (a) or (b).

The diene elastomers may have any microstructure, which depends on the polymerization conditions used, especially on the presence or absence of a modifying and/or randomizing agent and on the amounts of modifying and/or randomizing agent employed. The diene elastomers may, for example, be block, random, sequential or microsequential elastomers and may be prepared in dispersion or in solution; they may be coupled and/or star-branched or else functionalized with a coupling and/or star-branching or functionalization agent. For coupling to a reinforcing inorganic filler such as silica, mention may be made, for example, of silanol or polysiloxane functional groups bearing a silanol end (as described, for example, in FR2740778A1 or U.S. Pat. No. 6,013,718, and WO 2008/141702A1), alkoxysilane groups (as described, for example, in FR2765882A1 or U.S. Pat. No. 5,977,238), carboxylic groups (as described, for example, in WO01/92402A1 or U.S. Pat. No. 6,815,473, WO2004/096865A2 or US2006/0089445) or else polyether groups (as described, for example, in EP1127909A1 or U.S. Pat. No. 6,503,973, WO2009/000750A1 and WO2009/000752A1).

As functional diene elastomers, mention may also be made of those prepared using a functional initiator, especially those bearing an amine or tin function (see, for example, WO 2010/072761A1).

Mention may also be made, as other examples of functionalized diene elastomers that can be used in the invention, of elastomers (such as BR, NR or IR) of the epoxidized type.

Preferably, the polymer C is a diene elastomer and has a molar content of diene units of less than 15%.

Reinforcing Inorganic Filler

As indicated above, the rubber composition of the invention comprises at least one reinforcing inorganic filler, said reinforcing inorganic filler comprising silica.

The term "reinforcing inorganic filler" should be understood here as meaning any inorganic or mineral filler, regardless of its colour and its origin (natural or synthetic), also known as "white filler", "clear filler" or even "non-black filler", in contrast to carbon black; this inorganic filler being capable of reinforcing by itself alone, without means other than an intermediate coupling agent, a rubber composition intended for the manufacture of tyres, in other words capable of replacing, in its reinforcing role, a conventional tyre-grade carbon black. Such a filler is generally characterized, in a known way, by the presence of hydroxyl (—OH) groups at its surface, requiring, in order to be used as reinforcing filler, the use of a coupling agent or system intended to provide a stable chemical bond the filler and the elastomer matrix.

Mineral fillers of the siliceous type, preferentially silica ($SiO_2$), are especially suitable for use as reinforcing inorganic fillers. The silica used may be any reinforcing silica known to a person skilled in the art, in particular any precipitated or fumed silica with a BET specific surface area and also a CTAB specific surface area both of less than 450 m$^2$/g, preferably from 30 to 400 m$^2$/g, in particular between 60 and 300 m$^2$/g. Mention will be made, as highly dispersible precipitated silicas ("HDSs"), for example, of the Ultrasil 7000 and Ultrasil 7005 silicas from Evonik, the Zeosil 1165MP, 1135MP and 1115MP silicas and also the Zeosil Premium 200 silica from Solvay, the Hi-Sil EZ150G silica from PPG, the Zeopol 8715, 8745 and 8755 silicas from Huber or the silicas with a high specific surface area as described in application WO 03/016387A1.

Needless to say, the term "reinforcing inorganic filler" is also understood to mean mixtures of various reinforcing inorganic fillers, in particular of highly dispersible silicas as described above or a mixture of inorganic fillers of siliceous type and of non-siliceous inorganic fillers. As non-siliceous inorganic fillers, mention may be made of mineral fillers of the aluminous type, in particular of alumina ($Al_2O_3$) or aluminium (oxides)hydroxides, or else reinforcing titanium oxides, for example those described in U.S. Pat. Nos. 6,610,261 and 6,747,087. The non-siliceous inorganic fillers, when present, are in a minority amount in the reinforcing filler.

The physical state in which the inorganic reinforcing filler is provided is not important, whether it is in the form of a powder, of micropearls, of granules or else of beads.

More preferentially, the reinforcing inorganic filler consists of silica.

Of course, those skilled in the art know to apply the content of reinforcing inorganic filler as a function of the targeted applications for the rubber composition.

According to one embodiment, the content of the reinforcing filler in the rubber composition in accordance with the invention is greater than or equal to 20 parts by weight per hundred parts of elastomer. Preferably, the content of the reinforcing filler in the rubber composition in accordance with the invention ranges from 30 to 80 parts by weight per hundred parts of elastomer.

A person skilled in the art will understand that use might be made, as filler equivalent to the reinforcing inorganic filler described in the present section, of a reinforcing filler of another nature, especially organic nature, such as carbon black, provided that this reinforcing filler is covered with an inorganic layer, such as silica, or else includes, at its surface, functional sites, especially hydroxyl sites, requiring the use of a coupling agent in order to establish the bond between the filler and the copolymer(s) A. By way of example, mention may be made of the carbon blacks for tyres as described for example in patent documents WO96/37547A2 and WO 99/28380A1.

Carbon Black

According to one embodiment of the invention, the rubber composition may also comprise a reinforcing filler such as carbon black.

Carbon black, when it is present, may preferably be used at a content of less than or equal to 10 phr, preferably less than or equal to 5 phr. Preferably, the content of carbon black may range from 0.5 to 4 phr. These preferential ranges apply to any of the embodiments of the invention.

Any carbon black, especially the blacks conventionally used in tyres or their treads ("tyre-grade" blacks), are suitable for use as carbon blacks. Among the latter, mention will be made more particularly of the reinforcing carbon blacks of the 100, 200 and 300 series, or the blacks of the 500, 600 or 700 series (ASTM grades), for instance the N115, N134, N234, N326, N330, N339, N347, N375, N550, N683 and N772 blacks. These carbon blacks may be used in isolated form, as commercially available, or in any other form, for example as support for some of the rubber additives used.

Organosilane Coupling Agent of Formula (I)

As seen above, the rubber composition of the invention comprises, as agent for coupling between said copolymer A and said reinforcing inorganic filler, at least one organosilane compound of formula (I)

in which:
B represents a functional group interacting with the copolymer A, the group B being chosen from vinyl groups, halogen atoms, unsaturated α,β-enones, acryloxy groups, methacryloxy groups, acrylamido groups, methacrylamido groups and amino groups,
Z represents a spacer group formed of a divalent hydrocarbon-based chain comprising from 1 to 18 carbon atoms and making it possible to connect the group B to the silicon atom;
$G^1$, which are identical or different, each represent a monovalent hydrocarbon-based group chosen from linear or branched alkyls having from 1 to 18 carbon atoms, substituted or unsubstituted cycloalkyls or aryls having from 5 to 18 carbon atoms, substituted or unsubstituted alkenyloxyls having from 2 to 18 carbon atoms, substituted or unsubstituted aryloxy or aralkyloxy groups having from 6 to 18 carbon atoms, or a monovalent group in the form $R^1$—(—O—($CJ_2$)$_a$)$_b$—O— in which J represents a hydrogen, a phenyl group or an alkyl group having from 1 to 4 carbon atoms, b is an integer within the range 1 to 18 and a is an integer within the range 1 to 6, and $R_1$ being chosen from linear or branched, substituted or unsubstituted alkyls having from 1 to 4 carbon atoms or linear or branched, substituted or unsubstituted alkoxyls having from 1 to 4 carbon atoms;
$G^2$, which are identical or different, each represent a monovalent group chosen from the hydroxyl (—OH) group, linear or branched, substituted or unsubstituted alkoxyls having from 1 to 18 carbon atoms,
d is equal to 1, 2 or 3.

In the context of the present description, "coupling agent" (reinforcing inorganic filler/copolymer A) is intended to mean an agent able to establish a satisfactory connection, of chemical and/or physical nature, between the reinforcing inorganic filler and the copolymer A.

Such a coupling agent, which is at least bifunctional, has the simplified general formula "Y—W—X", in which:

Y represents a functional group ("Y" function) which is capable of being bonded physically and/or chemically to the reinforcing inorganic filler, it being possible for such a bond to be established, for example, between a silicon atom of the coupling agent and the surface hydroxyl (OH) groups of the inorganic filler (for example the surface silanols, when silica is concerned);

X represents a functional group ("X" function") capable of being bonded physically and/or chemically to the copolymer A;

W represents a divalent group which makes it possible to connect "Y" and "X".

The coupling agents should in particular not be confused with simple covering agents for the inorganic filler which, in a known way, can comprise the "Y" function, active with regard to the reinforcing inorganic filler, but are in all cases devoid of the "X" function, active with regard to the copolymer A.

Thus, for the organosilane compounds of general formula (I), those skilled in the art will immediately understand that the function denoted "X" in the above definition, intended to provide the bond to the copolymer A, is provided by the functional group B while the function denoted "Y" in the above definition, intended to provide the bond to the reinforcing inorganic filler, is provided by the silyl groups $Si(G^1)_{(3-d)}(G^2)_{(d)}$ and that the spacer group "W" is provided by the group Z which is a divalent group making it possible to connect the functional group B and the silyl groups $(G^1)_{(3-d)}(G^2)_{(d)}$ via the silicon atom.

In the context of the present invention, "vinyl group" is intended to mean a chemical group corresponding to the formula

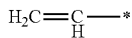

in which the symbol (*) represents the attachment to the spacer group Z.

In the context of the present invention, "halogen" is intended to mean a fluorine, chlorine, bromine or iodine atom; preferably a bromine atom.

"Unsaturated α,β-enone group" is intended to mean a chemical group corresponding to the following formula

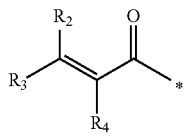

in which:
the symbol (*) represents the attachment to the spacer group Z,
R2, R3, R4, which are identical or different, represent a hydrogen atom, a linear or branched alkyl having from 1 to 4 carbon atoms, a phenyl that is substituted or not by an alkyl having from 1 to 4 carbon atoms.

In the context of the present invention, "acryloxy, methacryloxy, acrylamido and methacrylamido group" is intended to mean a chemical group corresponding to the following formula:

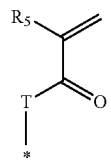

in which:
the symbol (*) represents the attachment to the spacer group Z,
R5 is a hydrogen atom (for the acryloxy and acrylamido groups) or a methyl (for the methacryloxy and methacrylamido groups),
T is an oxygen atom (for the acryloxy and methacryloxy groups) or a nitrogen atom (for the acrylamido and methacrylamido groups).

Preferentially, in the organosilane coupling agent of general formula (I), the hydrocarbon-based chain of the spacer group Z is interrupted by one or more heteroatoms chosen from oxygen, sulfur and nitrogen atoms.

Preferentially, in the organosilane coupling agent of general formula (I), the hydrocarbon-based chain of the spacer group Z is chosen from linear or branched C1-C18 alkylenes, C7-C12 alkylarylenes and C7-C12 arylalkylenes, preferably from linear or branched C1-C8 alkylenes, C7-C10 alkylarylenes and C7-C10 arylalkylenes.

Preferentially, in the organosilane coupling agent of general formula (I), $G^1$, which are identical or different, each represent a monovalent hydrocarbon-based group chosen from linear or branched alkyls having from 1 to 10 carbon atoms, substituted or unsubstituted cycloalkyls or aryls having from 5 to 10 carbon atoms, or a monovalent group in the form $R^1$—(—O—$(CJ_2)_a)_b$-O— in which J represents a hydrogen or an alkyl group having from 1 to 4 carbon atoms, b is an integer within the range 1 to 4 and a is an integer within the range 1 to 4, and $R_1$ being chosen from linear or branched, substituted or unsubstituted alkyls having from 1 to 4 carbon atoms or linear or branched, substituted or unsubstituted alkoxyls having from 1 to 4 carbon atoms; $G^2$, which are identical or different, each represent a monovalent group chosen from the hydroxyl (—OH) group, linear or branched, substituted or unsubstituted alkoxyls having from 1 to 10 carbon atoms, and d is equal to 1, 2 or 3.

More preferentially, in the organosilane coupling agent of general formula (I), $G^1$, which are identical or different, each represent a monovalent hydrocarbon-based group chosen from linear or branched alkyls having from 1 to 4 carbon atoms or a monovalent group in the form $R^1$—(—O—$(CJ_2)_a)_b$-O— in which J represents a hydrogen or an alkyl group having from 1 to 4 carbon atoms, b is an integer within the range 1 to 4 and a is an integer within the range 1 to 4, and $R_1$ being chosen from linear or branched, substituted or unsubstituted alkyls having from 1 to 4 carbon atoms or linear or branched, substituted or unsubstituted alkoxyls having from 1 to 4 carbon atoms, and $G^2$, which are identical or different, each represent a monovalent group chosen from the hydroxyl (—OH) group, linear or branched, substituted or unsubstituted alkoxyls having from 1 to 4 carbon atoms, and d is equal to 1, 2 or 3.

Preferentially, in the organosilane coupling agent of general formula (I), the group B is chosen from halogen atoms (preferably bromine), acryloxy groups, methacryloxy groups, acrylamido groups, methacrylamido groups and amino groups.

Advantageously, the preferred organosilane coupling agents of general formula (I) are those for which:

the group B is chosen from halogen atoms (preferably bromine), acryloxy groups, methacryloxy groups, acrylamido groups, methyacrylamido groups and amino groups;

the hydrocarbon-based chain of the group Z is chosen from linear or branched C1-C8 alkylenes, C7-C10 alkylarylenes and C7-C10 arylalkylenes;

$G^1$, which are identical or different, each represent a monovalent hydrocarbon-based group chosen from linear or branched alkyls having from 1 to 10 carbon atoms, substituted or unsubstituted cycloalkyls or aryls having from 5 to 10 carbon atoms, or a monovalent group in the form $R^1$—(—O—$(CJ_2)_a)_b$-O—, in which J represents a hydrogen or an alkyl group having from 1 to 4 carbon atoms, b is an integer within the range 1 to 4 and a is an integer within the range 1 to 4, and $R_1$ being chosen from linear or branched, substituted or unsubstituted alkyls having from 1 to 4 carbon atoms or linear or branched, substituted or unsubstituted alkoxyls having from 1 to 4 carbon atoms;

$G^2$, which are identical or different, each represent a monovalent group chosen from the hydroxyl (—OH) group, linear or branched, substituted or unsubstituted alkoxyls having from 1 to 10 carbon atoms; and d is equal to 1, 2 or 3.

More preferentially still, the preferred organosilane coupling agents of general formula (I) are those for which:

the group B is chosen from halogen atoms (preferably bromine), acryloxy groups, methacryloxy groups, acrylamido groups, methyacrylamido groups and amino groups;

the hydrocarbon-based chain of the group Z is chosen from linear or branched C1-C8 alkylenes;

$G^1$, which are identical or different, each represent a monovalent hydrocarbon-based group chosen from linear or branched alkyls having from 1 to 4 carbon atoms or a monovalent group in the form $R^1$—(—O—$(CJ_2)_a)_b$-O— in which J represents a hydrogen or an alkyl group having from 1 to 4 carbon atoms, b is an integer within the range 1 to 4 and a is an integer within the range 1 to 4, and $R_1$ being chosen from linear or branched, substituted or unsubstituted alkyls having from 1 to 4 carbon atoms or linear or branched, substituted or unsubstituted alkoxyls having from 1 to 4 carbon atoms;

$G^2$, which are identical or different, each represent a monovalent group chosen from the hydroxyl (—OH) group, linear or branched, substituted or unsubstituted alkoxyls having from 1 to 4 carbon atoms; and d is equal to 1, 2 or 3.

More preferentially still, the preferred organosilane coupling agents of general formula (I) are those for which:

the group B is chosen from halogen atoms (preferably bromine), acryloxy groups, methacryloxy groups, acrylamido groups, methyacrylamido groups and amino groups;

the hydrocarbon-based chain of the group Z is chosen from linear or branched C1-C8 alkylenes;

$G^1$, which are identical or different, each represent a monovalent hydrocarbon-based group chosen from methyl, ethyl, propyl, butyl;

$G^2$, which are identical or different, each represent a monovalent hydrocarbon-based group chosen from methoxy, ethoxy, propyloxy, butyloxy and hydroxyl (—OH), and d is equal to 1, 2, 3, preferably is equal to 3.

Preferentially, the organosilane coupling agents of formula (I) which are suitable for the invention are: 4-bromobutyltrimethoxysilane, 7-bromoheptyltrimethoxysilane, 5-bromopentyltrimethoxysilane, 3-bromopropyltrimethoxysilane, 11-bromoundecyltrimethoxysilane, 3-chloroisobutyltrimethoxysilane, (p-chloromethyl)phenyltrimethoxysilane, chloromethyltriethoxysilane, chloromethyltriisopropylsilane, chloromethyltrimethoxysilane, 3-chloropropryltriethoxysilane, 3-chloropropryltrimethoxysilane, 11-chloroundecyltriethoxysilane, 11-chlorooundecyltrimethoxysilane, 3-iodopropryltrimethoxysilane, chloromethylmethyldiethoxysilane, 3-chloropropylmethyldiethoxysilane, 3-chloropropylmethyldiisopropoxysilane, 3-chloropropylmethyldimethoxysilane, (3-iodopropyl)methyldiisopropoxysilane, 3-acrylamidopropyltrimethoxysilane, acryloxymethyltrimethoxysilane, (acryloxymethyl)phenylethyltrimethoxysilane, (3-acryloxypropyl)trimethoxysilane, (3-methacrylamidopropyl)triethoxysilane, methacryloxymethyltriethoxysilane, methacryloxymethyltrimethoxysilane, methacryloxypropyltriethoxysilane, methacryloxypropyltriisopropoxysilane, methacryloxypropyltrimethoxysilane, methacryloxypropyltris(methoxyethoxy)silane, 3-(acryloxypropyl)methyldiethoxysilane, 3-(acryloxypropyl)methyldimethoxysilane, (methacryloxymethyl)methyldiethoxysilane, (methacryloxymethyl)methyldimethoxysilane, methacryloxypropylmethyldiethoxysilane, methacryloxypropylmethyldimethoxysilane, 3-(acryloxypropyl)dimethylmethoxysilane, (methacryloxymethyl)dimethylethoxysilane, methacryloxypropyldimethylethoxysilane, methacryloxypropyldimethylmethoxysilane, 4-aminobutyltriethoxysilane, 4-amino-3,3-dimethylbutyltrimethoxysilane, 3-aminopropylethoxysilane, 3-aminopropyltrimethoxysilane, 3-aminopropyltri(methoxyethoxyethoxy)silane, 11-aminoundecyltriethoxysilane, 4-amino-3,3-dimethylbutylmethyldimethoxysilane, and 3-aminopropylmethyldiethoxysilane.

More preferentially, the organosilane coupling agents of formula (I) which are suitable for the invention are: 4-bromobutyltrimethoxysilane, 7-bromoheptyltrimethoxysilane, 5-bromopentyltrimethoxysilane, 3-bromopropyltrimethoxysilane, chloromethyltriethoxysilane, chloromethyltriisopropylsilane, chloromethyltrimethoxysilane, 3-chloropropryltriethoxysilane, 3-chloropropryltrimethoxysilane, 3-iodopropryltrimethoxysilane, 3-acrylamidopropyltrimethoxysilane, acryloxymethyltrimethoxysilane, (3-acryloxypropyl)trimethoxysilane, (3-methacrylamidopropyl)triethoxysilane, methacryloxymethyltriethoxysilane, methacryloxymethyltrimethoxysilane, methacryloxypropyltriethoxysilane, methacryloxypropyltriisopropopysilane, methacryloxypropyltrimethoxysilane, methacryloxypropyltris(methoxyethoxy)silane, 4-aminobutyltriethoxysilane, 4-amino-3,3-dimethylbutyltrimethoxysilane, 3-aminopropylethoxysilane, and 3-aminopropyltrimethoxysilane.

More preferentially still, the organosilane coupling agents of formula (I) which are suitable for the invention are: 4-bromobutyltrimethoxysilane, 7-bromoheptyltrimethoxysilane, 5-bromopentyltrimethoxysilane, 3-bromopropyltrimethoxysilane, 3-acrylamidopropyltrimethoxysilane, acryloxymethyltrimethoxysilane, (3-acryloxypropyl)trimethoxysilane, (3-methacrylamidopropyl)triethoxysilane, methacryloxymethyltriethoxysilane, methacryloxymethyltrimethoxysilane, methacryloxypropyltriethoxysilane, methacryloxypropyltrimethoxysilane, 4-aminobutyltriethoxysilane, 3-aminopropylethoxysilane, and 3-aminopropyltrimethoxysilane.

The use of a specific organosilane of general formula (I) as coupling agent makes it possible to obtain compositions, the elastomer matrix of which predominantly comprises one or more copolymers A as described above, and which especially have good reinforcement properties.

Of course, those skilled in the art know how to adjust the content of organosilane coupling agent of general formula (I) as a function of the content of reinforcing inorganic filler used in the compositions in accordance with the invention.

Preferentially, the content of organosilane coupling agent of general formula (I) ranges from 0.2 to 12 phr, preferably from 0.5 to 8 phr.

Preferentially, the content of organosilane coupling agent of general formula (I) is greater than or equal to 1% by weight relative to the weight of the reinforcing inorganic filler. Preferably, the content of organosilane coupling agent of general formula (I) ranges from 1% to 15% by weight relative to the weight of the reinforcing inorganic filler.

The organosilane coupling agents of general formula (I) and the processes for obtaining them are well-known to those skilled in the art and are commercially available from Gelest, Evonik and Bluestar.

Various Additives

The rubber compositions in accordance with the invention may also comprise all or some of the usual additives customarily used in rubber compositions, especially intended for the manufacture of semi-finished articles such as treads, and finished articles such as tyres, for instance pigments, protective agents such as antiozone waxes, for instance paraffin, chemical antiozonants, antioxidants, antifatigue agents and plasticizers.

Peroxide Crosslinking System

As specified previously, the composition of the invention comprises at least one peroxide crosslinking system.

"Peroxide crosslinking system" is intended to mean the use of one or more peroxides intended to crosslink a polymer, especially a copolymer and/or an elastomer. The peroxide(s) form(s), during its (their) activation, free radicals on the polymer, especially on the elastomer(s), which makes it possible to crosslink chains of the copolymer (of the elastomer) without the peroxide(s) being incorporated into these chains. Peroxides are well-known to those skilled in the art.

Among the peroxides well-known to those skilled in the art, it is preferable to use, for the invention, at least one peroxide chosen from the family of the organic peroxides. Organic peroxide is intended to mean any hydrocarbon-based molecule comprising a function of peroxo type O—O. For example, the organic peroxides which can be used are those which decompose rapidly in the temperature range from 140° C. to 220° C.

The organic peroxides may advantageously be chosen from the family of the dialkyl peroxides or peroxyesters. In particular, the organic peroxide(s) may be chosen from tert-butyl 2-ethylperhexanoate, dicumyl peroxide, benzoyl peroxide, dibenzoyl peroxide, di-tert-butyl peroxide, tert-butylcumyl peroxide, 2,5-bis(tert-butylperoxy)-2,5-dimethylhexane and mixtures thereof.

Various packaged products, known under their trade names, are available commercially; mention may be made of Dicup from Hercules Powder Co., Perkadox Y12 from Noury van der Lande, Peroximon F40 from Montecatini Edison S.p.A., Trigonox from Noury van der Lande, Varox from R.T. Vanderbilt Co. or else Luperko from Wallace & Tiernan Inc.

Preferentially, the amount of peroxides to be used for the requirements of the invention is less than or equal to 3 phr. Preferably, the amount of peroxides in the composition is within a range extending from 0.1 to 3 phr. More preferentially, the amount of peroxides in the composition is within a range extending from 0.2 to 2 phr.

The peroxide crosslinking system may also comprise a coagent and/or a solvent, such as those described in particular in WO2011/067504.

Production of the Compositions in Accordance with the Invention

The rubber compositions of the invention are produced in appropriate mixers using two successive preparation phases according to a general procedure well known to those skilled in the art.

The first (non-productive) phase is preferably carried out in several thermomechanical steps. During a first step, the copolymer A based on ethylene monomers and on vinyl acetate monomers, optionally one or more elastomer(s) other than the copolymer A based on ethylene monomers and on vinyl acetate monomers, the reinforcing inorganic filler(s), the organosilane coupling agent of formula (I) and/or other ingredients with the exception of the peroxide crosslinking system are introduced into an appropriate mixer, such as a standard internal mixer, at a temperature of between 20° C. and 100° C. and preferably between 25° C. and 100° C. After a few minutes, preferentially 0.5 to 2 min, and a temperature rise to reach 100° C., the other ingredients (that is to say those which remain if they have not all been introduced at the start) are added in one go or in parts, with the exception of the peroxide crosslinking system, during mixing ranging from 20 seconds to a few minutes. The total duration of the kneading, in this non-productive phase, is preferably between 2 and 10 minutes at a temperature of less than or equal to 180° C. and preferentially of less than or equal to 170° C. and under a pressure of a few bar (1 bar=100 000 Pa). Those skilled in the art know how to adapt the pressure as a function of the mixer used.

After cooling the mixture obtained in this way, the peroxide crosslinking system is then incorporated at low temperature (typically less than 100° C.), generally in an external mixture such as an open mill; everything is then mixed (second, "productive" phase) for a few minutes, for example between 5 and 15 min. Those skilled in the art know how to choose the suitable peroxide crosslinking system as a function of the copolymers and polymers used and of the temperature at which the crosslinking takes place.

The final composition thus obtained is subsequently calendered, for example in the form of a sheet or of a slab, in particular for laboratory characterization, or else extruded, in order to form, for example, a rubber profiled element used in the manufacture of semi-finished articles, in order to obtain products such as a tread. These products can subsequently be used in the manufacture of tyres, according to techniques known to a person skilled in the art.

The crosslinking (or curing) is carried out in a known way at a temperature generally of between 130° C. and 200° C., under pressure of a few tens of bar, for a sufficient time which can vary, for example, between 5 and 90 min, as a function in particular of the curing temperature, of the crosslinking system adopted, of the kinetics of crosslinking of the composition under consideration or else of the size of the tyre.

Semi-Finished Article for Tyres

Another subject of the present invention relates to a semi-finished article for tyres comprising at least one crosslinkable (able to be crosslinked) or crosslinked rubber composition as defined above or able to be obtained by the process described above.

A semi-finished product is a rubber product intended for tyre manufacture. This may be any type of rubber strip, such as especially treads, sublayers, crown reinforcement plies (for example working plies, protection plies or hooping plies), carcass reinforcement plies, sidewall plies, bead plies, protector plies, underlayer plies, rubber block plies and other plies providing an interface between the abovementioned regions of the tyres. Preferably, the semi-finished article is a tread.

Tyre

Another subject of the invention is a tyre comprising at least one semi-finished article for tyres as mentioned above or comprising at least one composition as defined above.

The tyre according to the invention may be intended in particular to equip motorless vehicles, such as bicycles, or motor vehicles of the passenger vehicle, SUV (Sports Utility Vehicles), two-wheel vehicle (especially motorcycles) or aircraft type, and industrial vehicles chosen from vans, heavy-duty vehicles (that is to say underground trains, buses, heavy road transport vehicles (lorries, tractors, trailers)) or off-road vehicles, such as heavy agricultural or construction plant vehicles, and other transportation or handling vehicles.

III. Examples

The examples which follow make it possible to illustrate the invention; however, the invention cannot be limited to these examples alone.

III-1) Preparation of the Compositions.

The following tests are carried out in the following way in order to prepare the compositions: the copolymer(s) and polymer(s), the reinforcing inorganic filler (silica), the coupling agent and then, after kneading for one to two minutes, the various other ingredients, with the exception of the crosslinking system or vulcanization system, are introduced into an internal mixer which is 70% filled and which has an initial vessel temperature of approximately 50° C. Thermomechanical working (non-productive phase) is then performed in one step (total kneading time equal to approximately 5 min), until a maximum "dropping" temperature of approximately 165° C. at atmospheric pressure is reached.

The mixture thus obtained is recovered and cooled and then the (peroxide) crosslinking system or vulcanization system (sulfur and accelerator) is added on an external mixer (homofinisher) at 70° C., everything being mixed (productive phase) for approximately 5 to 6 min.

The compositions thus obtained are subsequently calendered, either in the form of slabs (thickness of 2 to 3 mm) or of thin sheets of rubber, for the measurement of their physical or mechanical properties after curing, or in the form of profiled elements which can be used directly, after cutting and/or assembling to the desired dimensions, for example as semi-finished products for tyres, in particular as tyre treads.

In order to be able to be used in tyres, the rubber compositions must have a certain number of properties, including in particular a stiffness which does not change very much as a function of temperature, good reinforcement and good breaking stress.

More particularly, for the composition of the present invention, these properties are obtained when:

(a) the ratio of the nominal secant moduli at 50% elongation (MA50) measured at 23° C. and at 100° C. is less than or equal to 2, i.e. ((MA50 (at 23° C.)/MA50 (at 100° C.)≤2);

(b) the ratio of the nominal secant moduli at 100% elongation (MA100) measured at 23° C. and at 100° C. is less than or equal to 2, i.e. ((MA100 (at 23° C.)/ MA100 (at 100° C.)≤2);

(c) the ratio of the nominal secant modulus at 300% elongation (MA 300) measured at 23° C. and of the nominal secant modulus at 100% elongation (MA 100) measured at 23° C. is greater than or equal to 3, i.e. ((MA300 (at 23° C.)/MA100 (at 23° C.)≥3);

(d) the ratio of the nominal secant modulus at 300% elongation (MA 300) measured at 100° C. and of the nominal secant modulus at 100% elongation (MA 100) measured at 100° C. is greater than or equal to 3, i.e. ((MA300 (at 100° C.)/MA100 (at 100° C.)≥3);

(e) a nominal breaking stress of strictly greater than 12.5 MPa;

(f) a nominal secant modulus at 300% elongation measured at 23° C. (MA300) of strictly greater than 7.5 MPa.

The measurements (a) and (b) relate to the change in the stiffness as a function of temperature. The measurements (c) and (d) relate to the reinforcement properties at a low temperature (23° C.) and at a high temperature (100° C.), respectively. The measurement (e) represents the resistance to high strain. The measurement (f) relates to the stiffness of the rubber composition.

The composition T1 is a control composition conventionally used and sold for the manufacture of a tyre treads. It meets criteria (a) to (f) listed above, and thus has the desired properties for use in tyres.

It was sought to obtain these properties, or even to improve some of them, by modifying the elastomer used. These modifications are described in detail in test A. Tests B to E illustrate other embodiments of the invention.

The contents of the different constituents of the compositions presented in the different tables are expressed in phr. It is recalled that phr signifies parts by weight per hundred parts of elastomer. This unit is conventionally used in rubber compositions. By extension, it is also used in the compositions of the invention, where it analogously signifies parts by weight per hundred parts by weight of copolymer A.

III-2) Test A:

The object of the examples presented in table 1 is to compare the different rubber properties of the composition C1 in accordance with the invention to a series of control compositions (T1 to T4). The results of the properties measured after curing are presented in table 2.

The contents of the different constituents of the compositions presented in table 1 are expressed in phr.

TABLE 1

|  | Composition | | | | |
| --- | --- | --- | --- | --- | --- |
|  | T1 | T2 | T3 | T4 | C1 |
| Elastomer (1) | 100 | 100 | (—) | (—) | (—) |
| Copolymer A1 (2) | (—) | (—) | 100 | 100 | 100 |
| Silica (3) | 45 | 45 | 45 | 45 | 45 |
| Coupling agent (4) | 4.5 | 4.5 | (—) | 4.5 | (—) |
| Coupling agent (5) | (—) | (—) | (—) | (—) | 4.5 |

TABLE 1-continued

|  | Composition | | | | |
|---|---|---|---|---|---|
|  | T1 | T2 | T3 | T4 | C1 |
| Crosslinking system (6) | 1.5 | (—) | (—) | (—) | (—) |
| Crosslinking system (7) | (—) | 1.5 | 1.5 | 1.5 | 1.5 |

(1) Styrene-butadiene elastomer SBR comprising 27% styrene, and 24% 1.2- units (vinyl), 28% cis-1,4 units and 48% trans-1,4 units in the polybutadiene part; the glass transition temperature Tg thereof, measured by DSC (Differential Scanning Calorimetry) according to standard ASTM D3418 of 1999, is equal to −48° C.;
(2) Copolymer A1: Ethylene/vinyl acetate (EVA) copolymer sold by Arkema under the reference Evatane 42-60. Copolymer A1 has a molar percentage of ethylene monomer (E) equal to 81% and a molar percentage of vinyl acetate monomer (VA) equal to 19%. It has an MFI at 190° C. ranging from 65 to 85 g/10 min (MFI = Melt Flow Index, measured according to standard ASTM ISO 1133 of 2011) and a melting point Tm, measured according to standard ISO 11357 of 2013, equal to 48° C.;
(3) Silica "160 MP", sold by Solvay, the BET specific surface area of which, measured by the method described in section I-2), is 160 m$^2$/g;
(4) Organosilane polysulfide coupling agent: bis(3-triethoxysilpropyl) tetrasulfide (TESPT) sold by Evonik under the reference "SI69";
(5) Organosilane coupling agent of formula (I): methacryloxypropyltrimethoxysilane sold by Gelest (CAS no: 2530-85-0);
(6) Sulfur vulcanization system comprising 1.5 phr of sulfur and 1.5 phr of N-cyclohexyl-2-benzothiazolesulfenamide (CBS) accelerator. The accelerator is sold under the name "Santocure CBS" by Flexsys;
(7) Crosslinking system: dicumyl peroxide (DICUP) sold by Sigma Aldrich.

The control composition T2 differs from the control composition T1 by the nature of the crosslinking agent. The sulfur crosslinking (vulcanization) system of the control composition T1 was replaced by a peroxide crosslinker.

The control composition T3 differs from the control composition T2 in that it does not comprise a coupling agent. In addition, the chemical nature of the elastomer is different. The styrene-butadiene elastomer (SBR) of the control composition T2 was replaced by a copolymer based on ethylene and on vinyl acetate (EVA) (copolymer A1).

The control composition T4 differs from the control composition T3 by the presence of a coupling agent conventionally used for rubber compositions. This is an organosilane polysulfide.

The composition according to the invention (C1) differs from the composition T4 by the nature of the coupling agent. The organosilane polysulfide coupling agent conventionally used in rubber compositions, intended especially for tyres, was replaced by an organosilane compound of formula (I).

The properties of the compositions obtained after curing (approximately 20 min at 170° C.) are presented in the following table 2.

TABLE 2

|  | Composition No. | | | | |
|---|---|---|---|---|---|
|  | T1 | T2 | T3 | T4 | C1 |
| MA50 (at 23° C.)/MA50 (at 100° C.) | 1.0 | 0.9 | 2.1 | 9.7 | 1.7 |
| MA100 (at 23° C.)/MA100 (at 100° C.) | 1.1 | 1.0 | 1.9 | 9.9 | 1.7 |
| MA300 (at 23° C.)/MA100 (at 23° C.) | 4.3 | NC | 2.2 | 2.5 | 3.2 |
| MA300 (at 100° C.)/MA100 (at 100° C.) | 4.2 | NC | 2.8 | 1.5 | 3.5 |
| Nominal breaking stress in MPa (at 23° C.) | 21.4 | 12.3 | 20.8 | 10.0 | 21.4 |
| MA300 in MPa (at 23° C.) | 9.7 | NC | 7.2 | 6.7 | 17.9 |

NC: not communicated since it was not possible to carry out the measurements.

Compared to the control composition T1, the control composition T2 has too great a stiffness and breaks even before the modulus MA 300 can be measured. This composition is not acceptable for use in a tyre.

By replacing the SBR elastomer with an EVA copolymer and removing the coupling agent, the control composition T3 is obtained which, compared to the control composition T2, has a poorer change in stiffness with temperature than the control composition T2, but nonetheless acceptable (conditions (a) and (b) are met). The breaking stress of the control composition T3 was improved compared to that of the control composition T2 and is at an acceptable level for the use in question (condition (e) is met). The reinforcement at 23° C. and at 100° C. is significantly improved compared to that of the control composition T2; however, the desired level is not reached (conditions (c) and (d) are not met). The same applies for the stiffness (condition (f) is not met). This control composition T3 does not have all the desired properties.

A coupling agent conventionally used in rubber compositions intended for tyres, such as the organosilane bis(3-triethoxysilpropyl) tetrasulfide, was added to the control composition T3 (this gives the control composition T4). As expected, the reinforcement properties at 23° C. (condition (c)) of the control composition T4 were improved compared to that of the control composition T3. However, all the other properties were degraded and this control composition T4 cannot be suitable for use in tyres.

Surprisingly, by replacing the organosilane tetrasulfide coupling agent with an organosilane coupling agent of formula (I), it is observed that the composition C1 according to the invention has all the desired properties. Indeed, the composition C1 according to the invention has stiffness which does not change, or only changes very slightly, as a function of the temperature (conditions (a) and (b) are met), good properties of reinforcement at 23° C. and 100° C. (conditions (c) and (d) are met), good breaking stress and good stiffness (conditions (e) and (f), respectively, are met). The stiffness properties of the composition C1 according to the invention are even better than those of the control composition T1.

III-3) Test B:

The aim of the examples presented in table 3 is to show the rubber properties of the compositions in accordance with the invention C1 and C2 as a function of the content of organosilane coupling agent of general formula (I) used. The results of the properties measured after curing are presented in table 4 and are compared to the results of the control composition T3 described above.

The contents of the different constituents of the compositions C1, C2 and T3 presented in table 3 are expressed in phr. All the compositions have the same volume fraction of silica (16%). Only the content of coupling agent varies.

TABLE 3

|  | Composition | | |
|---|---|---|---|
|  | T3 | C1 | C2 |
| Copolymer A1 (1) | 100 | 100 | 100 |
| Silica (2) | 45 | 45 | 43 |
| Coupling agent (3) | (—) | 4.5 | 0.9 |
| Crosslinking system (4) | 1.5 | 1.5 | 1.5 |
| Percentage by weight of coupling agent relative to the weight of silica | 0% | 10% | 2% |

(1) Copolymer A1: Ethylene/vinyl acetate (EVA) copolymer sold by Arkema under the reference Evatane 42-60. Copolymer A1 has a molar percentage of ethylene monomer (E) equal to 81% and a molar percentage of vinyl acetate monomer (VA) equal to 19%. It has an MFI at 190° C. ranging from 65 to 85 g/10 min (MFI = Melt Flow Index, measured according to standard ASTM ISO 1133 of 2011) and a melting point Tm, measured according to standard ISO 11357 of 2013, equal to 48° C.;
(2) Silica "160 MP", sold by Solvay, the BET specific surface area of which, measured by the method described in section I-2), is 160 m$^2$/g;
(3) Organosilane coupling agent of formula (I): methacryloxypropyltrimethoxysilane sold by Gelest (CAS no: 2530-85-0);
(4) Crosslinking system: dicumyl peroxide (DICUP) sold by Sigma Aldrich.

The properties of the compositions obtained after curing (approximately 20 min at 170° C.) are presented in the following table 4.

TABLE 4

|  | Composition No. | | |
|---|---|---|---|
|  | T3 | C1 | C2 |
| MA50 (at 23° C.)/MA50 (at 100° C.) | 2.1 | 1.7 | 1.9 |
| MA100 (at 23° C.)/MA100 (at 100° C.) | 1.9 | 1.7 | 1.9 |
| MA300 (at 23° C.)/MA100 (at 23° C.) | 2.2 | 3.2 | 3.5 |
| MA300 (at 100° C.)/MA100 (at 100° C.) | 2.8 | 3.5 | 4.5 |
| Nominal breaking stress in MPa (at 23° C.) | 20.8 | 21.4 | 26.5 |
| MA300 in MPa (at 23° C.) | 7.2 | 17.9 | 14.7 |

The compositions C1 and T3 of this test are identical to the compositions C1 and T3 of test A. The composition C2 according to the invention represents another embodiment of the invention in which the content of coupling agent (organosilane of formula (I)) has been modified.

Table 4 shows the properties of the compositions C1 and C2 according to the invention compared to a control composition T3 which does not comprise any coupling agent.

It is observed that the compositions according to the invention C1 and C2 have stiffness which does not change, or only changes very slightly, relative to the temperature, like the control composition T3. However, the compositions C1 to C2 according to the invention have better reinforcement properties at 23° C. and at 100° C. and, surprisingly, better breaking stress and better stiffness compared to those of the control composition T3, regardless of the content of organosilane coupling agent of formula (I) used.

III-4) Test C:

The aim of the examples presented in table 5 is to show the rubber properties of the compositions in accordance with the invention C2, C3 and C4, which comprise different copolymers A. The results of the properties measured after curing are presented in table 6 and are compared to the results of the control composition T1.

The contents of the different constituents of the compositions C2, C3 and C4 and T1 presented in table 5 are expressed in phr. All the compositions have the same volume fraction of silica (16%) and the same percentage by weight of coupling agent relative to the silica (2%) for the compositions C2, C3 and C4. The composition T1 has a percentage by weight of coupling agent relative to the silica of 10%.

TABLE 5

|  | Composition | | | |
|---|---|---|---|---|
|  | T1 | C2 | C3 | C4 |
| Elastomer (1) | 100 | (—) | (—) | (—) |
| Copolymer A1 (2) | (—) | 100 | (—) | (—) |
| Copolymer A2 (3) | (—) | (—) | 100 | (—) |
| Copolymer A3 (4) | (—) | (—) | (—) | 100 |
| Silica (5) | 45 | 43 | 43 | 43 |
| Coupling agent (6) | 4.5 | (—) | (—) | (—) |
| Coupling agent (7) | (—) | 0.9 | 0.9 | 0.9 |

TABLE 5-continued

|  | Composition | | | |
|---|---|---|---|---|
|  | T1 | C2 | C3 | C4 |
| Crosslinking system (8) | 1.5 | (—) | (—) | (—) |
| Crosslinking system (9) | (—) | 1.5 | 1.5 | 1.5 |

(1) Styrene-butadiene elastomer SBR comprising 27% styrene, and 24% 1,2- units (vinyl), 28% cis-1,4 units and 48% trans-1,4 units in the polybutadiene part; the glass transition temperature Tg thereof, measured by DSC (Differential Scanning Calorimetry) according to standard ASTM D3418 of 1999, is equal to −48° C.;
(2) Copolymer A1: Ethylene/vinyl acetate (EVA) copolymer sold by Arkema under the reference Evatane 42-60. Copolymer A1 has a molar percentage of ethylene monomer (E) equal to 81% and a molar percentage of vinyl acetate monomer (VA) equal to 19%. It has an MFI at 190° C. ranging from 65 to 85 g/10 min (MFI = Melt Flow Index, measured according to standard ASTM ISO 1133 of 2011) and a melting point Tm, measured according to standard ISO 11357 of 2013, equal to 48° C.;
(3) Copolymer A2: ethylene/vinyl acetate (EVA) copolymer sold by Arlanxeo under the reference LEVAPREN 500. Copolymer A2 has a molar percentage of ethylene monomer (E) equal to 75% and a molar percentage of vinyl acetate monomer (VA) equal to 25%. It has a Mooney viscosity equal to 27 ± 4 MU (Mooney index 1 + 4 at 100° C. measured according to standard ASTM D1646 (MU = Mooney unit; 1 MU = 0.83 Newton · metre);
(4) Copolymer A3: ethylene/vinyl acetate (EVA) copolymer sold by Arlanxeo under the reference LEVAPREN 700. Copolymer A3 has a molar percentage of ethylene monomer (E) equal to 30% and a molar percentage of vinyl acetate monomer (VA) equal to 70%). It has a Mooney viscosity equal to 27 ± 4 MU (Mooney index 1 + 4 at 100° C. measured according to standard ASTM D1646);
(5) Silica "160 MP", sold by Solvay, the BET specific surface area of which, measured by the method described in section I-2), is 160 m²/g;
(6) Coupling agent: bis(3-triethoxysilylpropyl) tetrasulfide (TESPT) sold by Evonik under the reference "SI69";
(7) Organosilane coupling agent of formula (I): methacryloxypropyltrimethoxysilane sold by Gelest (CAS no: 2530-85-0);
(8) Sulfur crosslinking system comprising 1.5 phr of sulfur and 1.5 phr of N-cyclohexyl-2-benzothiazolesulfenamide (CBS) accelerator. The accelerator is sold under the name "Santocure CBS" by Flexsys;
(9) Crosslinking system: dicumyl peroxide (DICUP) sold by Sigma Aldrich.

The properties of the compositions obtained after curing (approximately 20 min at 170° C.) are presented in the following table 6.

TABLE 6

|  | Composition No. | | | |
|---|---|---|---|---|
|  | T1 | C2 | C3 | C4 |
| MA50 (at 23° C.)/MA50 (at 100° C.) | 1.0 | 1.9 | 1.6 | 1.4 |
| MA100 (at 23° C.)/MA100 (at 100° C.) | 1.1 | 1.9 | 1.6 | 1.5 |
| MA300 (at 23° C.)/MA100 (at 23° C.) | 4.3 | 3.5 | 4.4 | 5.0 |
| MA300 (at 100° C.)/MA100 (at 100° C.) | 4.2 | 4.5 | 4.6 | 4.9 |
| Nominal breaking stress in MPa (at 23° C.) | 21.4 | 26.5 | 28.5 | 25.1 |
| MA300 in MPa (at 23° C.) | 9.7 | 14.7 | 13.3 | 17.2 |

The control composition T1 of the test C is identical to that of the test A and the composition C2 in accordance with the invention of the test C is identical to that of the test B. The compositions C3 and C4 represent another embodiment of the invention in which the nature of the copolymer A is different.

Table 6 shows that the properties of the compositions C3 and C4 according to the invention are comparable to the properties of the composition C2 according to the invention. All the compositions according to the invention C2, C3 and C4 have the desired properties in terms of change in stiffness as a function of temperature, of reinforcement at 23° C. and at 100° C., of breaking stress and of stiffness. Some of these properties are even improved compared to those of the control composition T1 conventionally used for the manufacture of treads intended to equip tyres (control composition T1). Surprisingly, the improvement in these properties is obtained with lower contents by weight of coupling agents (organosilane of general formula (I)) than those used in the control composition T1.

III-5) Test D:

The aim of the examples presented in table 7 is to show the rubber properties of the compositions in accordance with the invention C2, C5 to C7 as a function of the different coupling agents (organosilane of general formula (I)) used. The results of the properties measured after curing are presented in table 8 and are compared to the results of the control composition T1 described above.

The contents of the different constituents of the compositions C2, C5 to C7 and T1 presented in table 7 are expressed in phr. All the compositions have the same volume fraction of silica (16%) and the same percentage by weight of coupling agent relative to the silica (2%) for the compositions C2, C5 and C7. The composition T1 has a percentage by weight of coupling agent relative to the silica of 10%.

TABLE 7

| | Composition | | | | |
|---|---|---|---|---|---|
| | T1 | C2 | C5 | C6 | C7 |
| Elastomer (1) | 100 | (—) | (—) | (—) | (—) |
| Copolymer A1 (2) | (—) | 100 | 100 | 100 | 100 |
| Silica (3) | 45 | 43 | 43 | 43 | 43 |
| Coupling agent (4) | 4.5 | (—) | (—) | (—) | (—) |
| Coupling agent (5) | (—) | 0.9 | (—) | (—) | (—) |
| Coupling agent (6) | (—) | (—) | 0.9 | (—) | (—) |
| Coupling agent (7) | (—) | (—) | (—) | 0.9 | (—) |
| Coupling agent (8) | (—) | (—) | (—) | (—) | 0.9 |
| Crosslinking system (9) | 1.5 | (—) | (—) | (—) | (—) |
| Crosslinking system (10) | (—) | 1.5 | 1.5 | 1.5 | 1.5 |

(1) Styrene-butadiene elastomer SBR comprising 27% styrene, and 24% 1,2- units (vinyl), 28% cis-1,4 units and 48% trans-1,4 units in the polybutadiene part; the glass transition temperature Tg thereof, measured by DSC (Differential Scanning Calorimetry) according to standard ASTM D3418 of 1999, is equal to −48° C.
(2) Copolymer A1: Ethylene/vinyl acetate (EVA) copolymer sold by Arkema under the reference Evatane 42-60. Copolymer A1 has a molar percentage of ethylene monomer (E) equal to 81% and a molar percentage of vinyl acetate monomer (VA) equal to 19%. It has an MFI at 190° C. ranging from 65 to 85 g/10 min (MFI = Melt Flow Index, measured according to standard ASTM ISO 1133 of 2011) and a melting point Tm, measured according to standard ISO 11357 of 2013, equal to 48° C.;
(3) Silica "160 MP", sold by Solvay, the BET specific surface area of which, measured by the method described in section I-2), is 160 m$^2$/g.
(4) Coupling agent: bis(3-triethoxysilpropyl) tetrasulfide (TESPT) sold by Evonik under the reference "SI69";
(5) Organosilane coupling agent of formula (I): methacryloxypropyltrimethoxysilane sold by Gelest (CAS no: 2530-85-0);
(6) Organosilane coupling agent of formula (I): 3-(triethoxysilyl)propyl methacrylate sold by Gelest (CAS no: 21142-29-0);
(7) Organosilane coupling agent of formula (I): 3-aminopropyltriethoxysilane sold by Gelest (CAS no: 919-30-2);
(8) Organosilane coupling agent of formula (I): 7-bromoheptyltrimethoxysilane sold by Gelest;
(9) Sulfur crosslinking system comprising 1.5 phr of sulfur and 1.5 phr of N-cyclohexyl-2-benzothiazolesulfenamide (CBS) accelerator. The accelerator is sold under the name "Santocure CBS" by Flexsys;
(10) Crosslinking system: dicumyl peroxide (DICUP) sold by Sigma Aldrich.

The properties of the compositions obtained after curing (approximately 20 min at 170° C.) are presented in the following table 8.

TABLE 8

| | Composition No. | | | | |
|---|---|---|---|---|---|
| | T1 | C2 | C5 | C6 | C7 |
| MA50 (at 23° C.)/MA50 (at 100° C.) | 1.0 | 1.9 | 1.9 | 1.9 | 1.9 |
| MA100 (at 23° C.)/MA100 (at 100° C.) | 1.1 | 1.9 | 1.9 | 1.9 | 1.9 |
| MA300 (at 23° C.)/MA100 (at 23° C.) | 4.3 | 3.5 | 3.6 | 3.5 | 3.2 |
| MA300 (at 100° C.)/MA100 (at 100° C.) | 4.2 | 4.5 | 5.2 | 4.9 | 4.1 |
| Nominal breaking stress in MPa (at 23° C.) | 21.4 | 26.5 | 25.4 | 25.8 | 24.0 |
| MA300 in MPa (at 23° C.) | 9.7 | 14.7 | 11.2 | 11.4 | 10.9 |

The control composition T1 of the test D is identical to that of the test A and the composition C2 in accordance with the invention of the test D is identical to that of the test B. The compositions C5 to C7 represent other embodiments of the invention in which the nature of the coupling agent (organosilane of formula (I)) is different to those of the preceding compositions.

Table 8 shows that the properties of the compositions C5 and C7 according to the invention are comparable to the properties of the composition C2 according to the invention. All the compositions according to the invention C2, C5 and C7 have the desired properties in terms of change in stiffness as a function of temperature, of reinforcement at 23° C. and at 100° C., of breaking stress and of stiffness. Surprisingly, the compositions C2 and C5 to C7 according to the invention, which have a lower content of coupling agent than that of the control composition T1, have better properties of breaking stress and of stiffness than those obtained for the control composition T1, regardless of the nature of the coupling agent (organosilane of formula (I)) used.

III-6) Test E:

The aim of the examples presented in table 9 is to show the rubber properties of the compositions in accordance with the invention C2, C8 to C10 as a function of the different contents of reinforcing inorganic fillers used. The results of the properties measured after curing are presented in table 10 and are compared to the results of the control composition T1 described above.

The contents of the different constituents of the compositions C2, C8 to C10 and T1 presented in table 7 are expressed in phr. The compositions have different volume fractions of silica for a same percentage by weight of coupling agent relative to the silica (2%), with the exception of the composition T1, the percentage by weight of coupling agent of which is equal to 10%.

TABLE 9

| | Composition | | | | |
|---|---|---|---|---|---|
| | T1 | C2 | C8 | C9 | C10 |
| SBR elastomer (1) | 100 | (—) | (—) | (—) | (—) |
| Copolymer A1 (2) | (—) | 100 | 100 | 100 | 100 |
| Silica (3) | 45 | 43 | 34 | 38 | 49 |
| Coupling agent (4) | 4.5 | (—) | (—) | (—) | (—) |
| Coupling agent (5) | (—) | 0.9 | 0.7 | 0.8 | 1 |
| Crosslinking system (6) | 1.5 | (—) | (—) | (—) | (—) |
| Crosslinking system (7) | (—) | 1.5 | 1.5 | 1.5 | 1.5 |
| Volume fraction of silica (%) | 16 | 16 | 13 | 14.5 | 18 |
| % by weight of coupling agent relative to silica | 10 | 2 | 2 | 2 | 2 |

(1) Styrene-butadiene elastomer SBR comprising 27% styrene, and 24% 1,2- units (vinyl), 28% cis-1,4 units and 48% trans-1,4 units in the polybutadiene part; the glass transition temperature Tg thereof, measured by DSC (Differential Scanning Calorimetry) according to standard ASTM D3418 (1999), is equal to −48° C.;
(2) Copolymer A1: Ethylene/vinyl acetate (EVA) copolymer sold by Arkema under the reference Evatane 42-60. Copolymer A1 has a molar percentage of ethylene monomer (E) equal to 81% and a molar percentage of vinyl acetate monomer (VA) equal to 19%. It has an MFI at 190° C. ranging from 65 to 85 g/10 min (MFI = Melt Flow Index, measured according to standard ASTM ISO 1133 of 2011) and a melting point Tm, measured according to standard ISO 11357 of 2013, equal to 48° C.;
(3) Silica "160 MP", sold by Solvay, the BET specific surface area of which, measured by the method described in section I-2), is 160 m$^2$/g.
(4) Coupling agent: bis(3-triethoxysilpropyl) tetrasulfide (TESPT) sold by Evonik under the reference "SI69";
(5) Organosilane coupling agent of formula (I): methacryloxypropyltrimethoxysilane sold by Gelest (CAS no: 2530-85-0);
(6) Sulfur crosslinking system comprising 1.5 phr of sulfur and 1.5 phr of N-cyclohexyl-2-benzothiazolesulfenamide (CBS) accelerator. The accelerator is sold under the name "Santocure CBS" by Flexsys;
(7) Crosslinking system: dicumyl peroxide (DICUP) sold by Sigma Aldrich.

The properties of the compositions obtained after curing (approximately 20 min at 170° C.) are presented in the following table 10.

TABLE 10

|  | Composition No. | | | | |
| --- | --- | --- | --- | --- | --- |
|  | T1 | C2 | C8 | C9 | C10 |
| MA50 (at 23° C.)/MA50 (at 100° C.) | 1.0 | 1.9 | 1.9 | 1.9 | 1.8 |
| MA100 (at 23° C.)/MA100 (at 100° C.) | 1.1 | 1.9 | 1.9 | 1.9 | 1.8 |
| MA300 (at 23° C.)/MA100 (at 23° C.) | 4.3 | 3.5 | 3.6 | 3.5 | 3.4 |
| MA300 (at 100° C.)/MA100 (at 100° C.) | 4.2 | 4.5 | 4.4 | 4.0 | 4.1 |
| Nominal breaking stress in MPa (at 23° C.) | 21.4 | 26.5 | 25.0 | 22.7 | 24.5 |
| MA300 in MPa (at 23° C.) | 9.7 | 14.7 | 10.8 | 14.2 | 16.9 |

The control composition T1 of the test D is identical to that of the test A and the composition C2 in accordance with the invention of the test D is identical to that of the test B. The compositions C5 to C7 represent other embodiments of the invention in which the content of reinforcing inorganic filler is different to that of the preceding compositions.

Table 10 shows that the properties of the compositions C8 to C10 according to the invention are comparable to the properties of the composition C2 according to the invention. All the compositions according to the invention C2, C8 to C10 have the desired properties in terms of change in stiffness as a function of temperature, of reinforcement at 23° C. and at 100° C., of breaking stress and of stiffness. Surprisingly, the composition C8 according to the invention, which has a lower content of silica and of coupling agent (organosilane of formula (I)) than that of the control composition T1, has better reinforcement properties at 100° C. and also better properties of breaking stress and of stiffness than those obtained for the control composition T1.

The invention claimed is:

1. A rubber composition based on at least:
a copolymer A consisting of at least one ethylene monomer and at least one vinyl acetate monomer;
a reinforcing inorganic filler comprising silica;
a peroxide crosslinking system; and
as agent for coupling between the copolymer A and the reinforcing inorganic filler, an organosilane compound of formula (I):

$$B\text{---}Z\text{---}Si(G^1)_{(3-d)}(G^2)_{(d)} \quad (I),$$

in which:
B represents a functional group interacting with the copolymer A, the group B being selected from the group consisting of vinyl groups, halogen atoms, unsaturated α,β-enones, acryloxy groups, methacryloxy groups, acrylamido groups, methacrylamido groups and amino groups,
Z represents a spacer group formed of a divalent hydrocarbon-based chain comprising from 1 to 18 carbon atoms and making it possible to connect the group B to the silicon atom;
$G^1$, which are identical or different, each is a monovalent hydrocarbon-based group or a monovalent group in the form $R^1\text{---}(\text{---}O\text{---}(CJ_2)_a)_b\text{---}O\text{---}$,
wherein the monovalent hydrocarbon-based group is selected from the group consisting of linear or branched alkyls having from 1 to 18 carbon atoms, substituted or unsubstituted cycloalkyls or aryls having from 5 to 18 carbon atoms, substituted or unsubstituted alkenyloxyls having from 2 to 18 carbon atoms, substituted or unsubstituted aryloxy or aralkyloxy groups having from 6 to 18 carbon atoms, and
wherein, for the monovalent group in the form $R^1\text{---}(\text{---}O\text{---}(CJ_2)_a)_b\text{---}O\text{---}$, J is selected from the group consisting of hydrogen, a phenyl group or an alkyl group having from 1 to 4 carbon atoms, b is an integer within the range 1 to 18, a is an integer within the range 1 to 6, and $R_1$ is selected from the group consisting of linear or branched, substituted or unsubstituted alkyls having from 1 to 4 carbon atoms or linear or branched, substituted or unsubstituted alkoxyls having from 1 to 4 carbon atoms,
$G^2$, which are identical or different, each represent a monovalent group selected from the group consisting of hydroxyl group, and linear or branched, substituted or unsubstituted alkoxyls having from 1 to 18 carbon atoms,
d is equal to 1, 2 or 3,
wherein a molar content of ethylene monomer in copolymer A is greater than or equal to 51%,
wherein a content of the organosilane compound of formula (I) ranges from 0.5 to 8 phr,
wherein a content of reinforcing inorganic filler is greater than or equal to 20 phr, and
wherein a content of copolymer A is greater than 50 phr.

2. The rubber composition according to claim 1, wherein the hydrocarbon-based chain of the spacer group Z is interrupted with one or more heteroatoms chosen from O, S and N.

3. The rubber composition according to claim 1, wherein the spacer group Z is selected from the group consisting of linear or branched C1-C18 alkylenes, C7-C12 alkylarylenes and C7-C12 arylalkylenes.

4. The rubber composition according to claim 1, wherein, for $G^1$, which are identical or different, the monovalent hydrocarbon-based group is selected from the group consisting of linear or branched alkyls having from 1 to 10 carbon atoms, substituted or unsubstituted cycloalkyls or aryls having from 5 to 10 carbon atoms,
for the monovalent group in the form $R^1\text{---}(\text{---}O\text{---}(CJ_2)_a)_b\text{---}O\text{---}$, J is selected from the group consisting of hydrogen and an alkyl group having from 1 to 4 carbon atoms, b is an integer within the range 1 to 4, a is an integer within the range 1 to 4, and $R_1$ is selected from the group consisting of linear or branched, substituted or unsubstituted alkyls having from 1 to 4 carbon atoms and linear or branched, substituted or unsubstituted alkoxyls having from 1 to 4 carbon atoms, and
wherein, for $G^2$, which are identical or different, each is a monovalent group selected from the group consisting of the hydroxyl group, and linear or branched, substituted or unsubstituted alkoxyls having from 1 to 10 carbon atoms.

5. The rubber composition according to claim 1, wherein the coupling agent is an organosilane compound of formula (I), in which:
the group B is selected from the group consisting of halogen atoms, acryloxy groups, methacryloxy groups, acrylamido groups, methyacrylamido groups and amino groups;
Z is a spacer group formed of a divalent hydrocarbon-based chain and is selected from the group consisting of linear or branched C1-C8 alkylenes;

G¹, which are identical or different, each is a monovalent hydrocarbon-based group or a monovalent group in the form $R^1$—(—O—$(CJ_2)_a)_b$—O—, the monovalent hydrocarbon-based group being selected from the group consisting of linear or branched alkyls having from 1 to 4 carbon atoms, and for the monovalent group in the form $R^1$—(—O—$(CJ_2)_a)_b$—O—, J is selected from the group consisting of hydrogen and an alkyl group having from 1 to 4 carbon atoms, b is an integer within the range 1 to 4, a is an integer within the range 1 to 4, and $R_1$ is selected from the group consisting of linear or branched, substituted or unsubstituted alkyls having from 1 to 4 carbon atoms and linear or branched, substituted or unsubstituted alkoxyls having from 1 to 4 carbon atoms;

G², which are identical or different, each is a monovalent group selected from the group consisting of hydroxyl group, and linear or branched, substituted or unsubstituted alkoxyls having from 1 to 4 carbon atoms; and d is equal to 1, 2 or 3.

6. The rubber composition according to claim 1, wherein the molar content of ethylene monomer in the copolymer A ranges from 57% to 90%.

7. The rubber composition according to claim 1, wherein the rubber composition comprises a mixture of copolymers A that are different from one another.

8. The rubber composition according to claim 1, wherein a content of copolymer A is equal to 100 phr.

9. The rubber composition according to claim 1, wherein the reinforcing inorganic filler consists of silica.

10. The rubber composition according to claim 1 further comprising a polymer C, different from the copolymer A, polymer C being a diene elastomer.

11. The rubber composition according to claim 10, wherein the diene elastomer has a molar content of diene units of less than 15%.

12. The rubber composition according to claim 1, wherein a content of the organosilane compound of formula (I) is greater than or equal to 1% by weight relative to the weight of the reinforcing inorganic filler.

13. The rubber composition according to claim 12, wherein the content of the organosilane compound of formula (I) ranges from 1% to 15% by weight relative to the weight of the reinforcing inorganic filler.

14. A semi-finished article for tires comprising at least one rubber composition according to claim 1.

15. A tire comprising at least one rubber composition according to claim 1.

* * * * *